United States Patent
Truong

(10) Patent No.: US 10,225,440 B2
(45) Date of Patent: Mar. 5, 2019

(54) SYSTEM AND METHOD FOR SECURELY STORING AND CHARGING MOBILE DEVICES

(71) Applicant: KYOCERA Document Solutions Inc., Osaka (JP)

(72) Inventor: Duc Phu Truong, West Covina, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 78 days.

(21) Appl. No.: 15/088,031

(22) Filed: Mar. 31, 2016

(65) Prior Publication Data

US 2017/0288450 A1 Oct. 5, 2017

(51) Int. Cl.
| | | |
|---|---|---|
| H04N 1/44 | (2006.01) | |
| H04B 5/00 | (2006.01) | |
| H02J 7/00 | (2006.01) | |
| H02J 7/02 | (2016.01) | |
| H04N 1/00 | (2006.01) | |
| H02J 50/10 | (2016.01) | |

(52) U.S. Cl.
CPC ......... *H04N 1/4433* (2013.01); *H02J 7/0027* (2013.01); *H02J 7/0044* (2013.01); *H02J 7/025* (2013.01); *H02J 50/10* (2016.02); *H04B 5/0037* (2013.01); *H04N 1/00127* (2013.01); *H04N 1/00519* (2013.01); *H04N 2201/0094* (2013.01)

(58) Field of Classification Search
CPC .......................................................... H02J 7/04
USPC .......................................................... 320/115
See application file for complete search history.

(56) References Cited

U.S. PATENT DOCUMENTS

| | | | |
|---|---|---|---|
| 2006/0184705 A1 | 8/2006 | Nakajima | |
| 2014/0340698 A1 | 11/2014 | Baba | |
| 2014/0354214 A1* | 12/2014 | Phelps | ..................... G07F 15/00 320/107 |
| 2015/0084590 A1* | 3/2015 | Pearlman | ............... H02J 7/0027 320/111 |
| 2015/0130402 A1* | 5/2015 | O'Neill | ................... H02J 7/041 320/107 |

(Continued)

FOREIGN PATENT DOCUMENTS

| | | |
|---|---|---|
| JP | 2005-103992 A | 4/2005 |
| JP | 2005-125634 A | 5/2005 |

*Primary Examiner* — Suresh Memula
(74) *Attorney, Agent, or Firm* — McDonnell Boehnen Hulbert & Berghoff LLP

(57) ABSTRACT

A system for securely storing and charging a mobile device includes an AC-connectable device, such as a multi-function printer or photocopier, having a charging area and a power source, wherein a mobile device such as a smartphone, a tablet computer, an e-reader or a portable rechargeable battery pack, is charged by placing the mobile device in the charging area and attaching the device to the power source. The charging area allows for the mobile device to be secured to or within the AC-connectable device. The charging area can be configured in many ways, including as a movable locking compartment, a fixed locking compartment or a rotatable locking compartment. The mobile device may also be used to power the AC-connectable device when it is not connected to an AC power source. The system also optionally provides for cleaning, sanitizing or drying of the mobile device while it is in the charging area.

17 Claims, 16 Drawing Sheets

(56) References Cited

U.S. PATENT DOCUMENTS

2016/0156207 A1\* 6/2016 Frankenberger ...... H02J 7/0027
  320/101

\* cited by examiner

SYSTEM AND METHOD FOR SECURELY STORING AND CHARGING MOBILE DEVICES

BACKGROUND

In recent years, there has been a wide proliferation of battery-powered, rechargeable mobile devices. Such devices include mobile phones, tablet computers, e-readers, digital photography devices, and portable, rechargeable battery packs among others. As a result of the frequent use of these devices, there is often a need to recharge the device batteries. Because the device owners and users may not always carry charging cables or power supplies or have them otherwise readily available, there is a need to provide charging capabilities for the mobile devices, and in particular, portable charging capabilities.

Because these devices may be charged in areas where there is wide access to a large number of people, there is also a need to provide for a secure method of charging a mobile device that prevents unauthorized removal of the mobile device.

These types of mobile devices experience extensive and repeated use on a frequent basis, and are therefore often in need of cleaning. They are also often exposed to harsh environmental conditions such as rain. Thus, there is a need to provide systems and methods for cleaning, sanitizing, and or drying the mobile devices. For the most efficient use of the mobile device owner's time, it is preferable to allow for concurrent charging and cleaning of the device.

SUMMARY

Example embodiments of the present invention provide a system for securely storing and charging a mobile device that includes an AC-connectable device, such as a multi-function printer or photocopier, having a charging area and a power source. The charging area of the AC-connectable device allows for the mobile device to be secured, whether by physically connecting the AC-connectable device and the mobile device or by providing a lockable compartment into which the mobile device may be deposited. Example locks are preferably controlled by user-defined authentication codes. Further example embodiments of the invention further provide for user interfaces for transmitting and receiving authentication codes.

In some embodiments, the mobile device may itself be a portable rechargeable battery pack having a rechargeable battery and first and second ports, which may be connected to the power source of the AC-connectable device through the first port to allow for charging of the battery charger. A second mobile device such as a smartphone, tablet computer or digital photographic device may then be connected to the battery charger through the first port, allowing for charging of the mobile device. The battery pack may be charged without a mobile device present. The battery pack is portable and may be used to power or charge the mobile device separately from the AC-connectable device. The battery pack may also be used to power the AC-connectable device when it is not connected to an AC power source.

Example embodiments of the systems of the invention also optionally contain mechanisms for cleaning, sanitizing and/or drying mobile devices, either concurrently with or separately from charging.

DETAILED DESCRIPTION OF THE DRAWINGS

Example methods and systems are described herein. Other example embodiments or features may further be utilized, and other changes may be made, without departing from the scope of the subject matter presented herein. In the following detailed description, reference is made to the accompanying figures, which form a part thereof.

The example embodiments described herein are not meant to be limiting. Thus, aspects of the present disclosure, as generally described herein and illustrated in the figures, can be arranged, substituted, combined, separated and designed in a wide variety of different configurations, all of which are explicitly contemplated herein.

Given that AC-connectable electronic devices, such as multifunction printers, photocopiers and scanners are frequently present in home, office and travel settings (for instance, hotels), these electronic devices provide a suitable platform for offering secure charging services, as well as providing additional capabilities such as the ability to store, clean, sanitize or dry a mobile device, or to print from the mobile device via its connection to the AC-connectable device controller while the mobile device is being charged.

Figure 1:
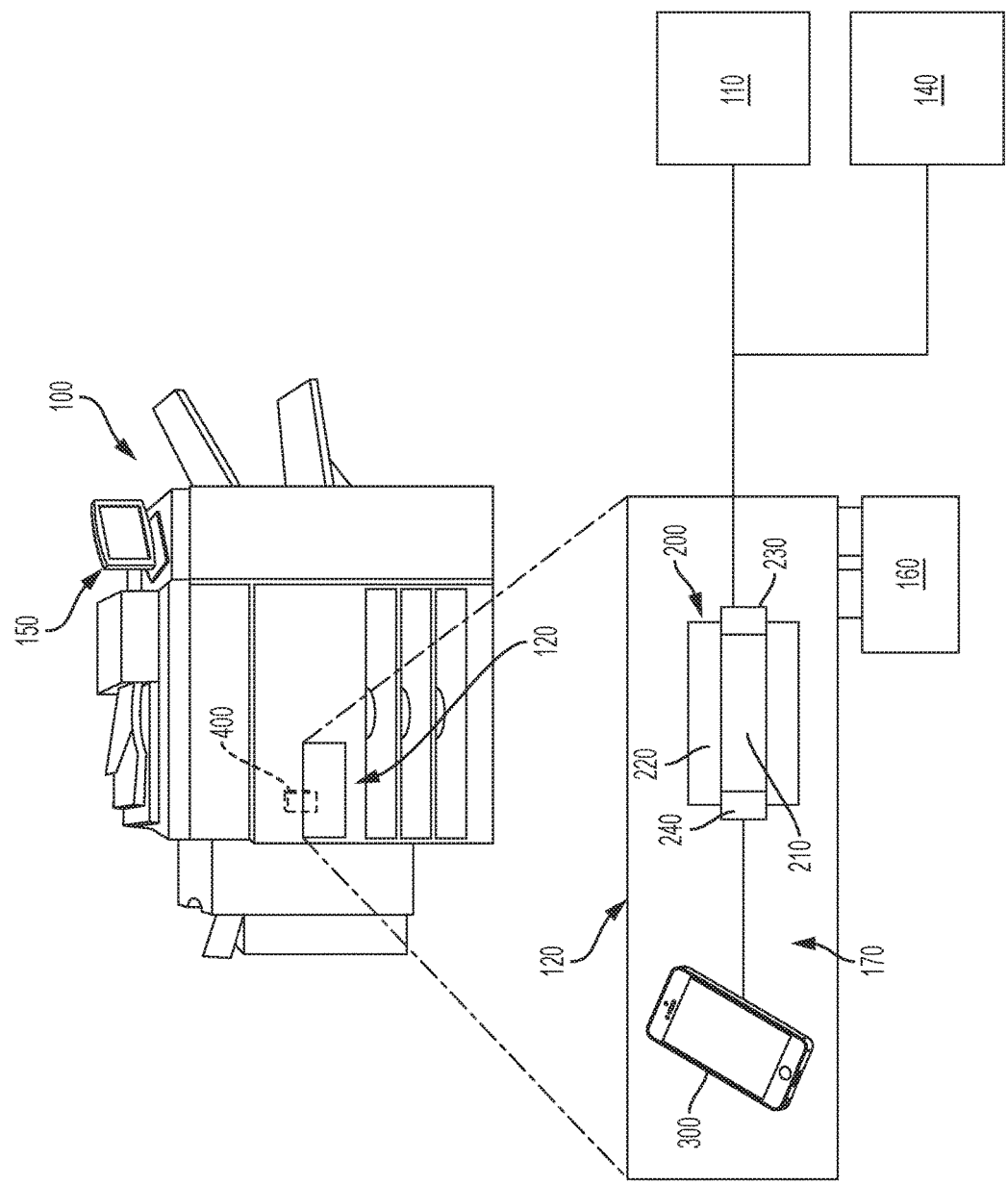
FIG. 1 is a front view of an example system according to an embodiment of the invention, showing an AC-connectable device with a moveable, lockable compartment for depositing and charging a battery charger, a battery charger connected to the AC-connectable device, and a mobile device connected to the battery charger.

In an example system according to the invention, as shown in FIG. 1, an AC-connectable device 100 having a power source 110, a charging area 120 for charging a mobile device, and a lock 400 for securing the mobile device is provided. AC-connectable device 100 may also optionally include a controller 140 and a control interface 150. In an example embodiment, AC-connectable device 100 is an image-forming apparatus, such as a photocopy machine or a multifunction printer. AC-connectable device 100 may, however, be any device that allows transfer of charge from power source 110 to battery charger 200. Other examples of AC-connectable device 100 include home printers, portable printers and scanners.

Because AC-connectable device 100 may be located in an area of significant public traffic (e.g. businesses, hotels, etc.), it may be desirable to ensure that mobile device 300 remains secure during charging. To do so, some embodiments of the invention provide for locking of mobile device 300 to AC-connectable device 100 through use of lock 400. A wide variety of locking mechanisms can be used in accordance with embodiments of the invention, whether mechanical locks, magnetic locks, biometric locks or other electronic locks.

Charging area 120 may be a surface on AC-connectable device 100, a shelf, a recess, a closable compartment, a lockable compartment, a moveable compartment, a sliding tray or other area designed to receive the mobile device and allow for connection between the mobile device and AC-connectable device 100. Charging area 120 may be disposed in any part of AC-connectable device 100 that does not interfere with or preclude normal operation of the device. For example, when AC-connectable device 100 is a photocopy machine or a multi-function printer, charging area 120 may be placed in the upper front left section of the device in order to avoid interference with the paper trays, the paper feed mechanism, or the control interface for the device. Alternatively, charging area 120 may be disposed on the side of the AC-connectable device in order to more efficiently use space. For smaller devices such as portable printers, charging area 120 may be a panel on the device that allows connection between battery charger 200 and device 100. In yet another alternative embodiment, charging area 120 is designed to allow for inductive charging of the mobile device.

Figure 1A:
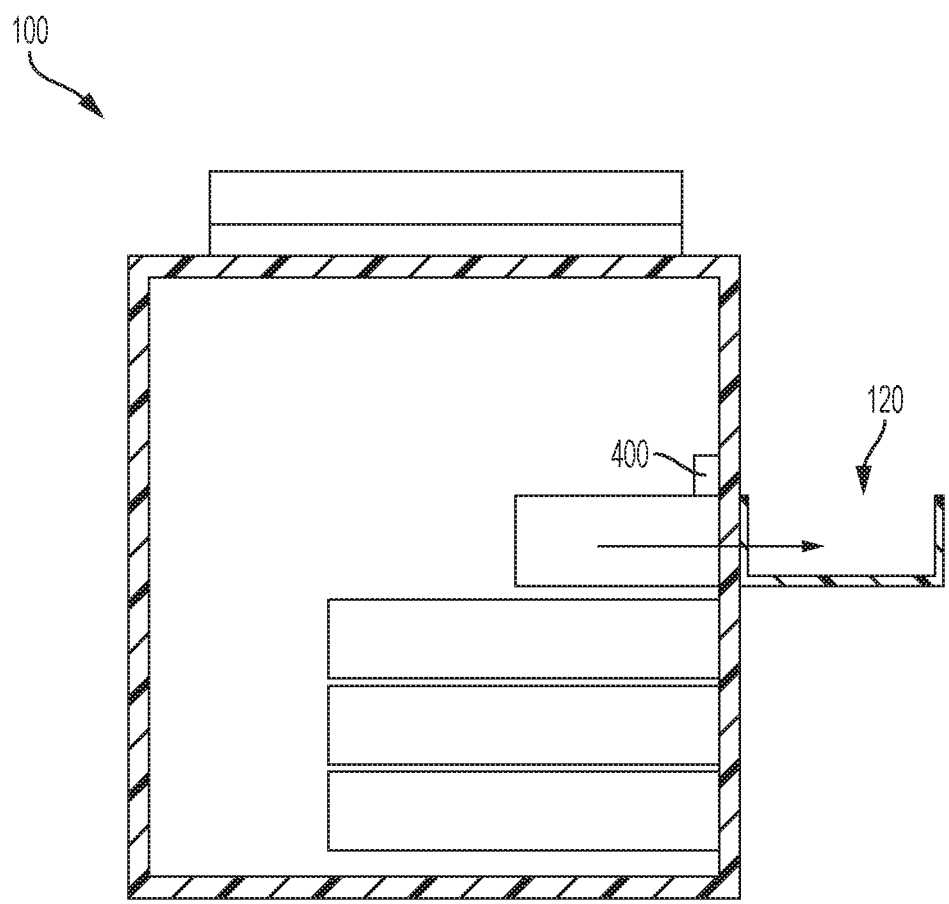
FIG. 1A is cross-sectional view of an a example system, showing an AC-connectable device with a moveable, lockable compartment for depositing and charging a battery charger, a battery charger connected to the AC-connectable device, and a mobile device connected to the battery charger.

In an example embodiment of the system, as shown in FIG. 1, charging area 120 of AC-connectable device 100 comprises a lockable, moveable compartment 170. Drive 160 reversibly engages with moveable compartment 170 to cause the compartment to extend from AC-connectable device 100, thereby allowing a mobile device user to deposit a mobile device 300 into compartment 170, and connect mobile device 300 to power source 110. Once mobile device 300 is connected to power source 110 and deposited into moveable compartment 170, drive 160 engages with the compartment to cause it to retract into AC-connectable device 100. In this embodiment, when moveable compartment is in a fully retracted position, it may then be locked. As with prior example embodiments, one of skill in the art would understand that any number of locks may be used to secure moveable compartment 170. FIG. 1A depicts the moveable compartment 170 extended from the AC-connectable device 100.

Figure 2:
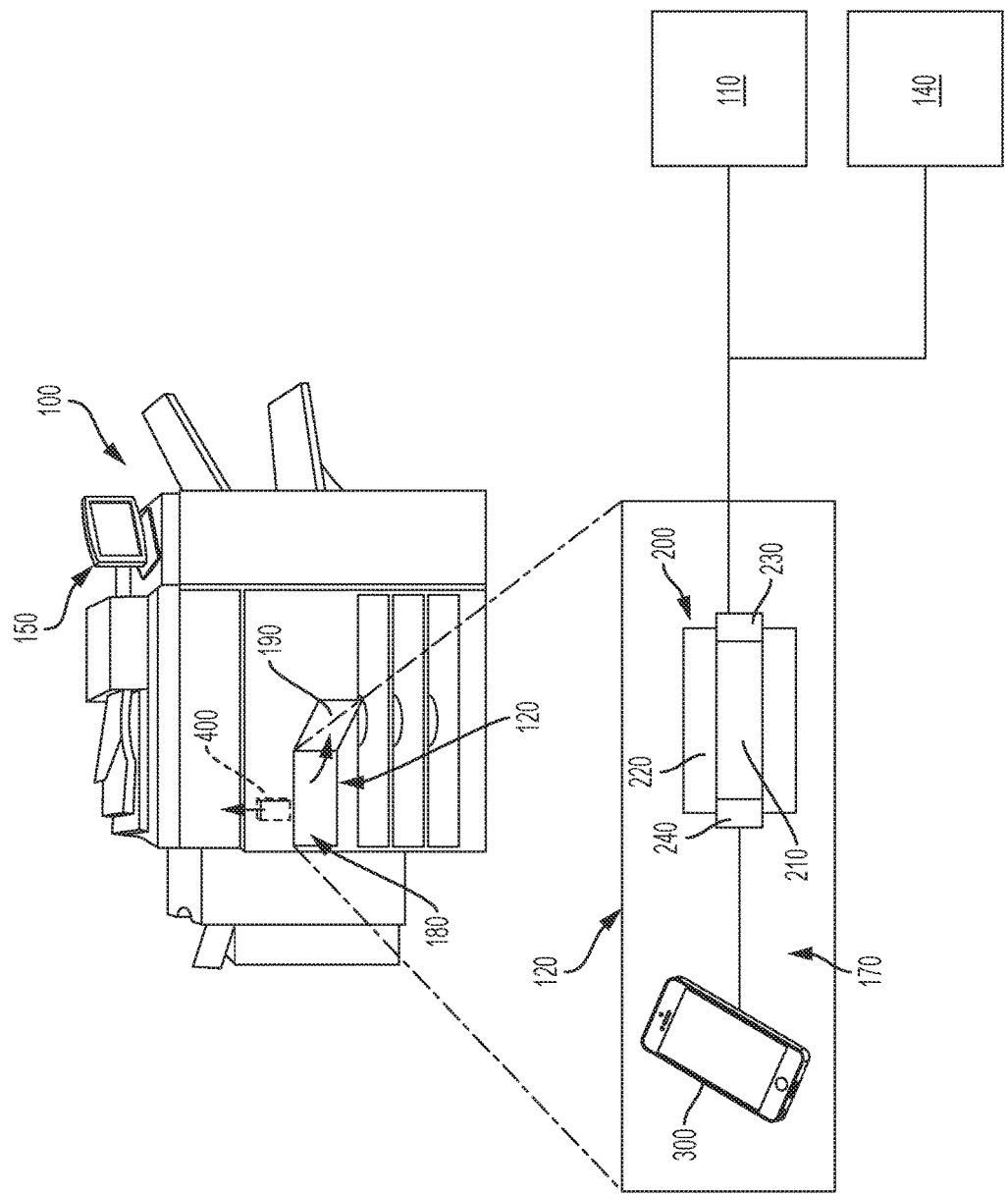
FIG. 2 is a front view of an example system according to an embodiment of the invention, showing an AC-connectable device with a fixed compartment having a lockable door for depositing and charging a battery charger, a battery charger connected to the AC-connectable device, and a mobile device connected to the battery charger.

In a separate example embodiment, as shown in FIG. 2, charging area 120 may alternatively comprise a fixed compartment 180 with a lockable door 190. Lock 400 may be disengaged to allow lockable door 190 to open. A mobile device 300 may then be placed into fixed compartment 180 and connected to power source 110. Lockable door 190 may then be closed and lock 400 engaged to secure mobile device 300 during charging.

Figure 3:
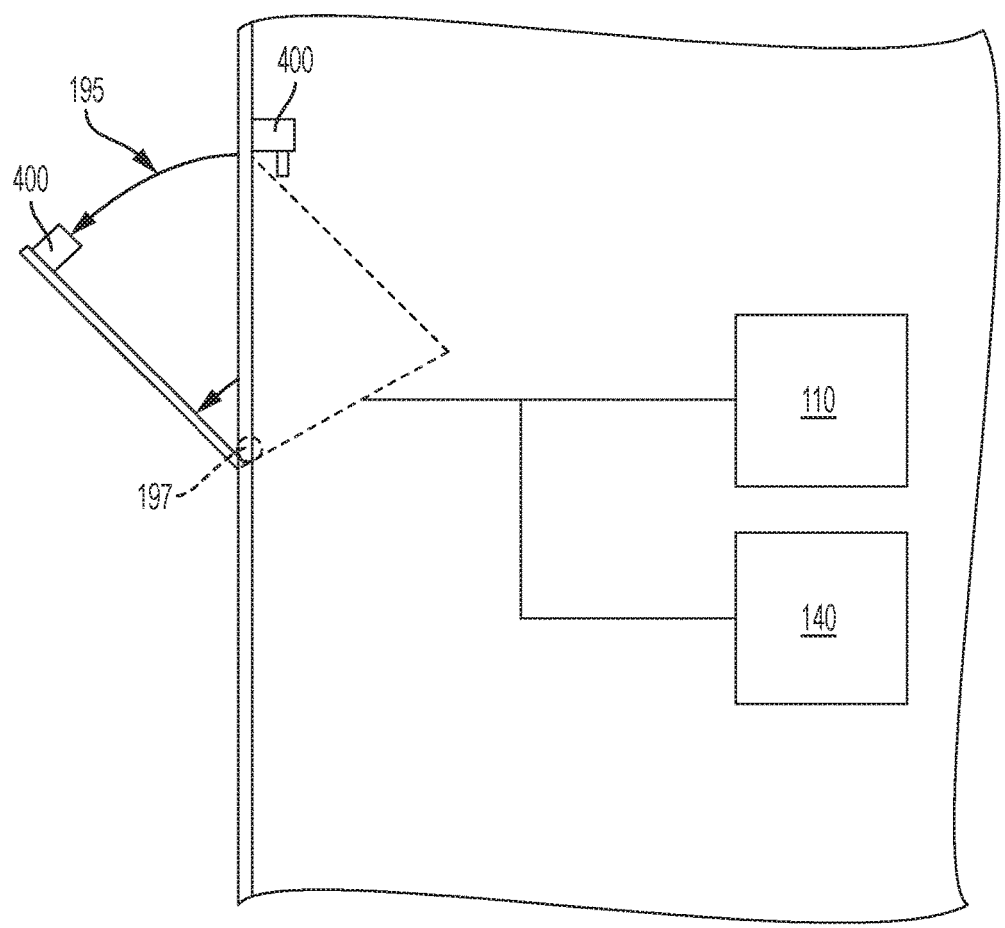
FIG. 3 is an front view example system, showing the use of a lockable compartment that flips or rotates open to accommodate the mobile device.

In a further example embodiment, as shown in FIG. 3, charging area 120 comprises a compartment 195 that flips out or rotates out from AC-connectable device 100 to allow for connection and deposit of the mobile device. When charging area 120 is a flipping or rotating compartment, it may be located in the side of AC-connectable device 100, leading to more efficient space usage in AC-connectable device 100 and requiring fewer or less complicated components than other example embodiments, such as sliding drawers. As a result, this embodiment may be more cost effective to manufacture than other compartment configurations, and also may be easier to maintain, thereby reducing operating costs. For example, in this embodiment, compartment 195 may open by action of a simple hinge 197. When compartment 195 is retracted into AC-connectable device 100, it may then be secured by engaging lock 400.

Figure 4:
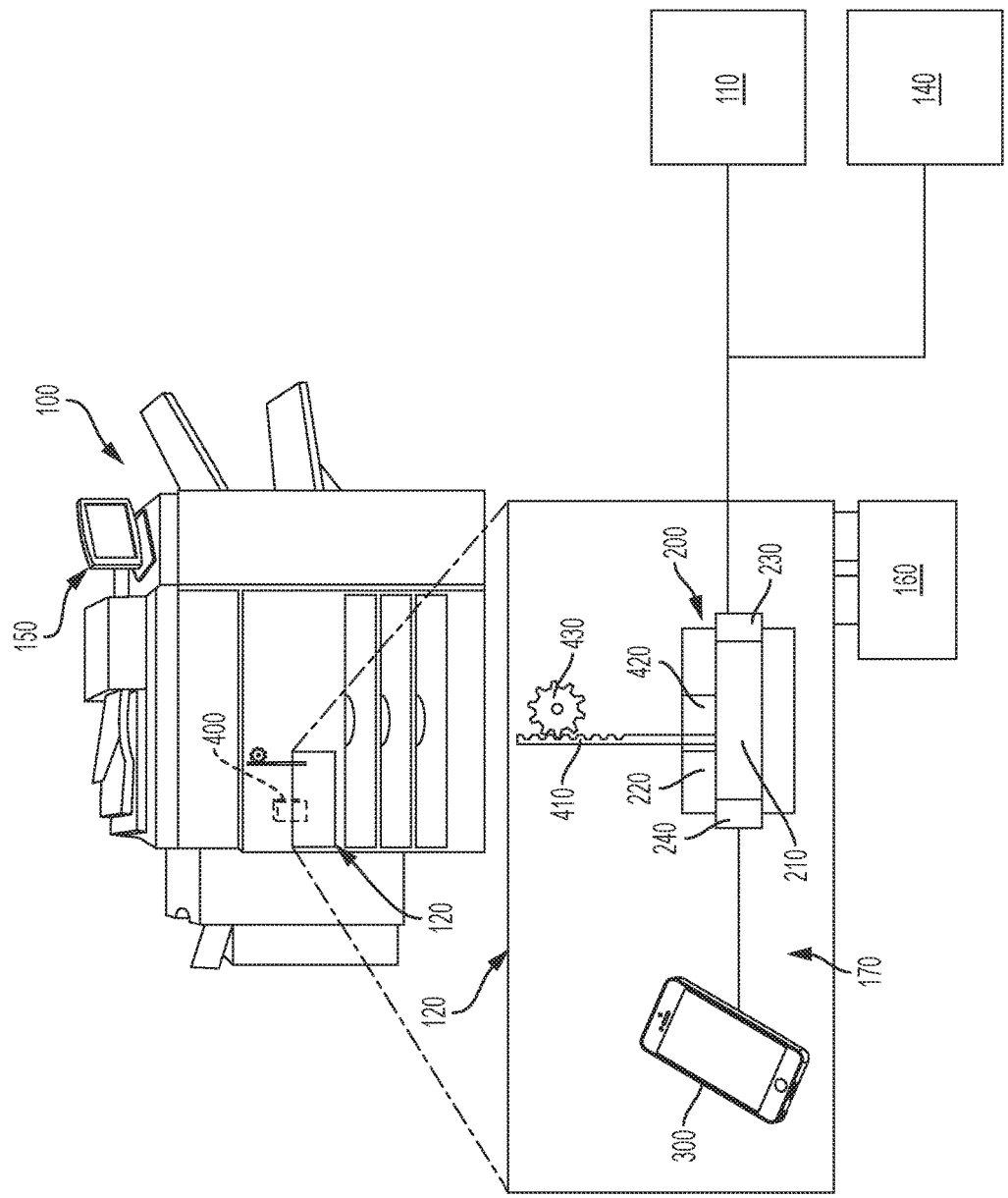
FIG. 4 is a cross-sectional view of an example system according to an embodiment of the invention, showing the physical locking of a battery charger to an AC-connectable device.

In order to secure mobile device 300 during storage, charging, cleaning, sanitizing or drying, embodiments of the system include a variety of locks, which may be disposed solely within the AC-connectable device 100, or which may include components in both AC-connectable device 100 and mobile device 300. FIG. 4 shows an example lock 400 comprising a moveable shaft 410 in AC-connectable device 100, an aperture 420 in housing 220 of battery charger 200 and a gear 430. Gear 430 reversibly engages shaft 410 and positions it in aperture 420 to lock battery charger 200 to AC-connectable device 100. When the system receives an unlock command, gear 430 re-engages with shaft 410 and retracts it from aperture 420 to release battery charger 200.

Various embodiments of the invention also provide for the use of locks requiring authentication for operation. To facilitate authentication-based locking in example systems of the present invention, the system may further comprise a user interface 440. User interface 440 may be located on AC-connectable device 100, battery charger 200, mobile device 300 or on any device with a data connection to AC-connectable device 100 (e.g. a desktop computer or laptop). Alternatively, the user interface may be embedded in the charging area. For example, the user interface may be disposed on the face of the moveable drawer, on the door to the fixed compartment or on the face of the rotating or flipping compartment. In alternative configurations of the charging area, user interface 440 may be disposed in any location readily accessible to the user when the compartment is closed and/or locked.

User interface 440 may take many forms, including a keypad or keyboard; a touch-enabled display; a magnetic card reader; an RFID chip reader; an NFC card reader; a biometric sensor such as a fingerprint scanner, retina scanner or voice recognition sensor; another sensor for receiving authentications signals (e.g. wi-fi signals, Bluetooth signals, etc.); or an application on mobile device 300 that communicates with lock 400. Alternatively, user interface 440 may be a graphical user interface programmed into the AC-connectable device or any device that can communicate with the AC-connectable device, including battery charger 200, mobile device 300, and other devices. Example embodiments are shown in FIGS. 5A-5G.

The user interfaces described herein are particularly advantageous for allowing the use of the charging compartment by multiple users, no matter how many charging compartments are present in the AC-connectable device. The system need not be tied to a particular authentication code, but may allow and recognize codes from a number of different users. By providing a single interface for entry of numerous authentication codes, the system provides greater flexibility and also requires less space than if an authentication device were required for each separate user, thereby allowing more space on the AC-connectable devices for controls that are not related to the charging area.

Figure 5A:
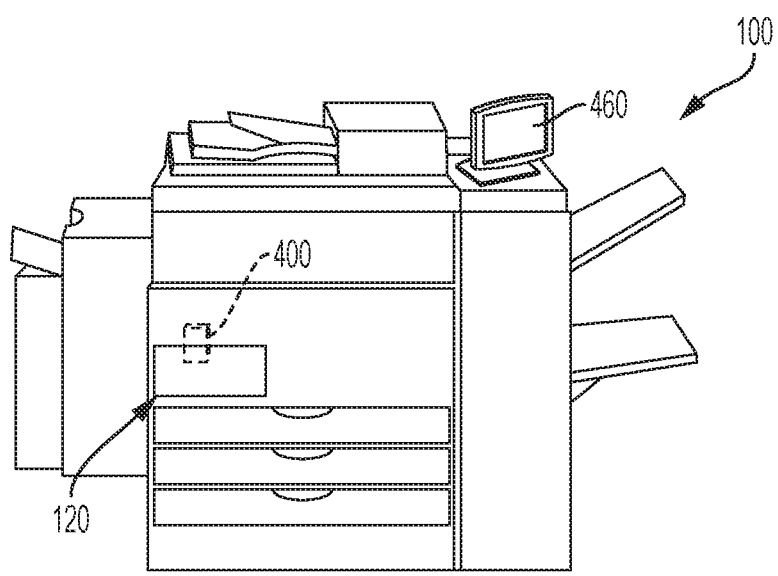
FIG. 5A is an example system, showing a touch-enabled display on the AC-connectable device for entering an authentication code to engage and disengage the locking mechanism.

FIG. 5A shows an alternative example embodiment where user interface 400 is a touch-enabled display 460 on AC-connectable device 100. Entry and acceptance of an appropriate authentication signal through the display causes lock 400 to engage or disengage as desired. Touch-enabled display 460 may be the same as control interface 150 on AC-connectable device 100.

Figure 5B:
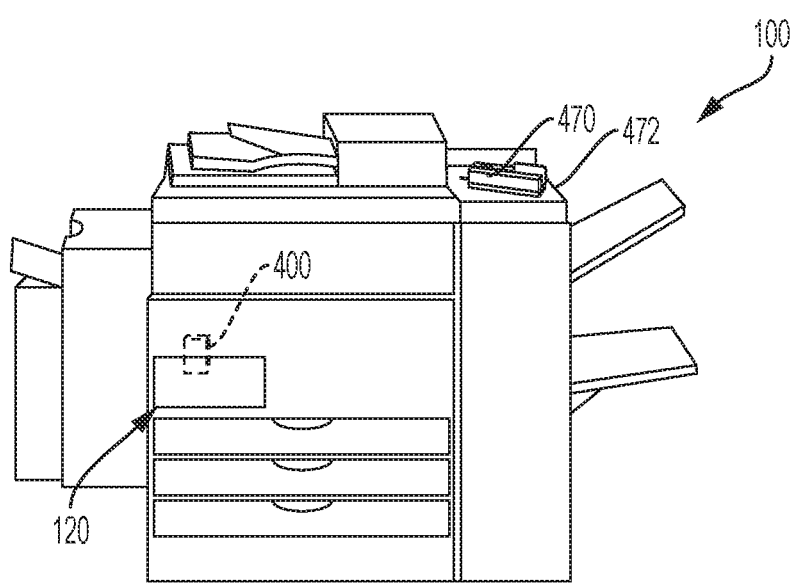
FIG. 5B is an example system, showing a magnetic card reader on the AC-connectable device for entering an authentication code to engage and disengage the locking mechanism.

FIG. 5B shows an alternative example embodiment where user interface 400 is a magnetic card reader 470 on AC-connectable device 100. Sliding a magnetic card 472 containing a user password through the reader generates a lock or unlock signal, and, upon acceptance and authentication of the signal, lock 400 engages or disengages as desired.

Figure 5C:
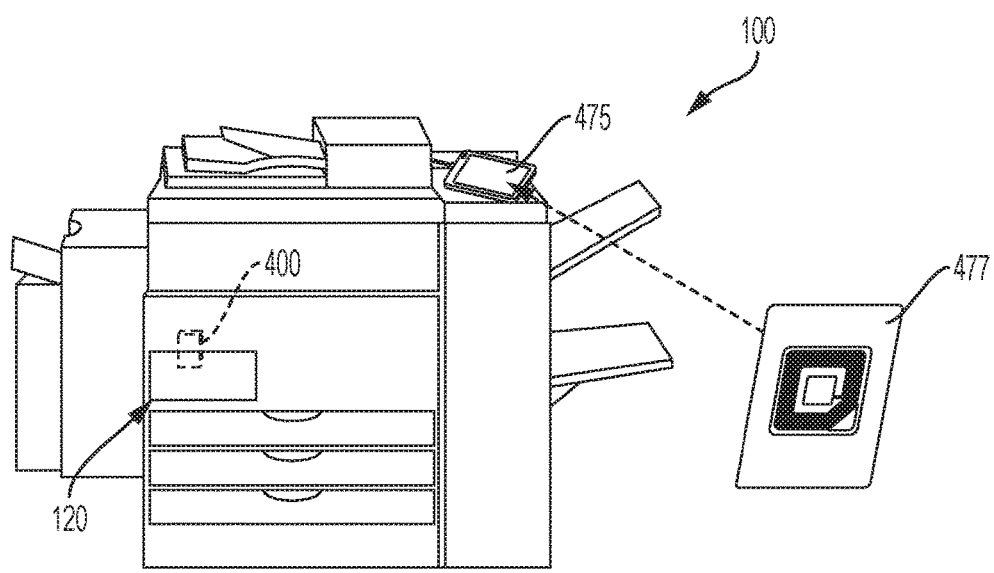
FIG. 5C is an example system, showing an RFID card reader on the AC-connectable device for entering an authentication code to engage and disengage the locking mechanism.

FIG. 5C shows an alternative example embodiment where user interface 400 is an RFID chip reader 475 on AC-connectable device 100. Upon recognizing and authenticating a signal form a user's RFID chip 477, RFID card reader 475 causes lock 400 to engage or disengage as desired.

Figure 5D:
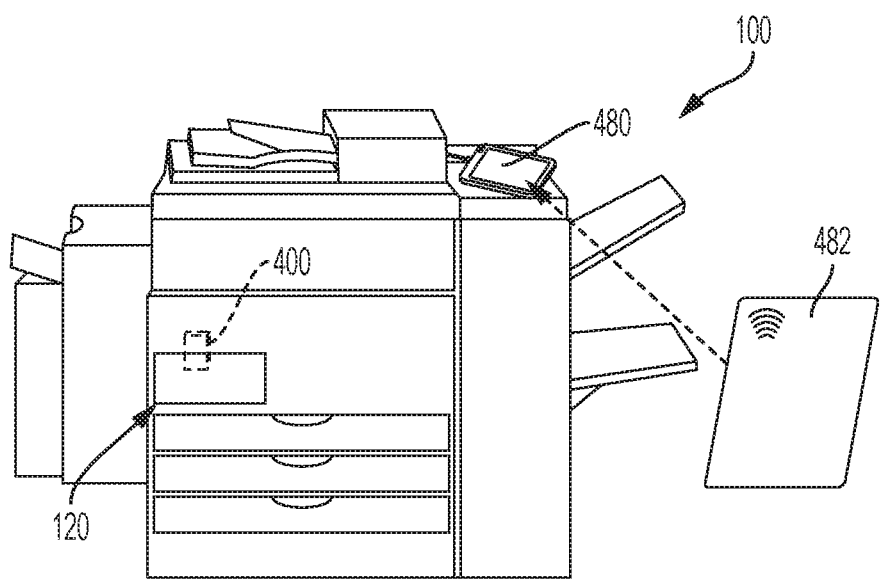
FIG. 5D is an example system, showing an NFC card reader on the AC-connectable device for entering an authentication code to engage and disengage the locking mechanism.

FIG. 5D shows an alternative example embodiment where user interface 400 is an NFC card reader 480 on AC-connectable device 100. Bringing the user's NFC card 482 into sufficient proximity to NFC card reader 480 to allow it to recognize and authenticate a signal causes lock 400 to engage or disengage as desired.

Figure 5E:
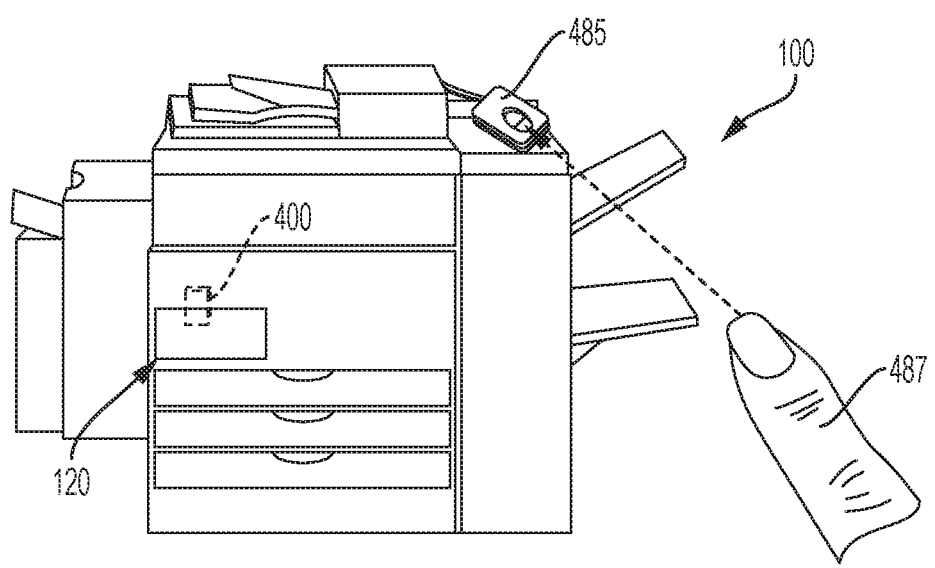
FIG. 5E is an example system, showing a fingerprint scanner on the AC-connectable device for entering an authentication code to engage and disengage the locking mechanism.

FIG. 5E shows an alternative example embodiment where user interface 400 is a fingerprint scanner 485 on AC-connectable device 100. When user's finger 487 is brought into proximity with scanner 485 and the user's fingerprint is recognized and authenticated by the system, lock 400 is engaged or disengaged as desired.

Figure 5F:
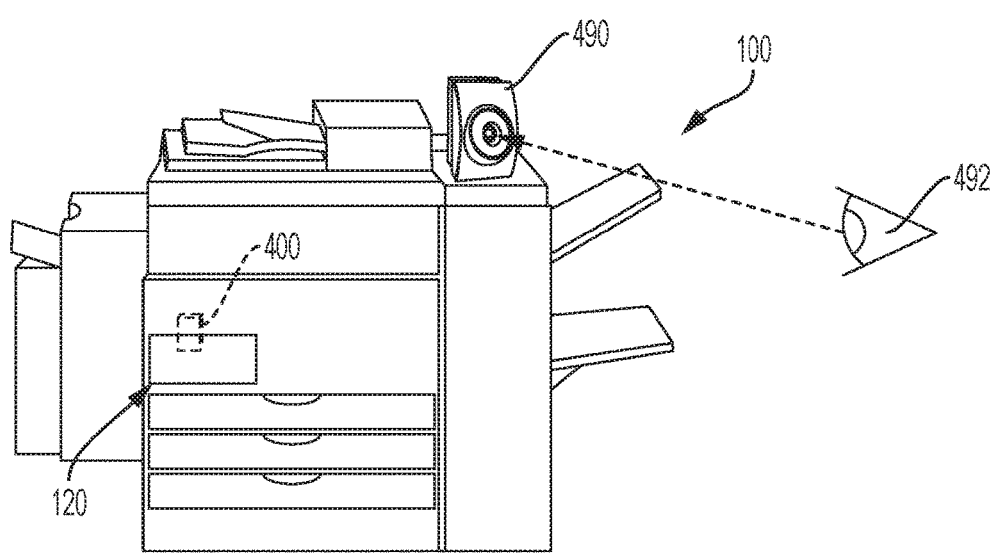
FIG. 5F is an example system, showing a retina scanner on the AC-connectable device for entering an authentication code to engage and disengage the locking mechanism.

FIG. 5F shows an alternative example embodiment where user interface 400 is a retina scanner 490 on AC-connectable device 100. When user's eye 492 is brought into proximity with scanner 490 and the user's retinal pattern is recognized and authenticated by the system, lock 400 is engaged or disengaged as desired.

Figure 5G:
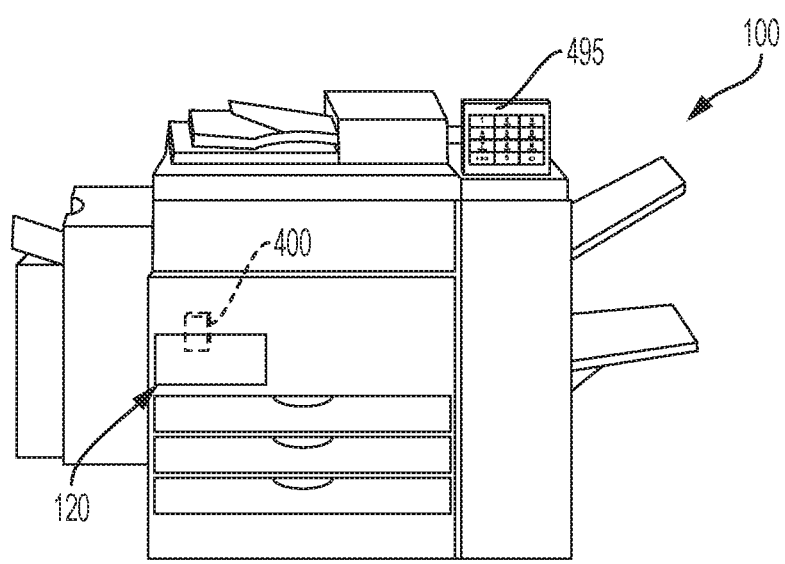
FIG. 5G is an example system, showing a keypad on the AC-connectable device for entering an authentication code to engage and disengage the locking mechanism.

FIG. 5G shows an alternative example embodiment where user interface 400 is a keypad 495 on AC-connectable device 100. The user may directly enter an authentication code using keypad 490 causing lock 400 to engage or disengage as desired.

While various embodiments of authentication-based locking systems and their locations have been described herein, one of skill in the art would recognize that other types of authentication systems and other locations for authentications would work equally well. For example, the authentication systems described above could be located on the compartments themselves, the doors to the compartments, or, given proper space requirements, on a battery charger or mobile device.

As shown in FIG. 1, in an example embodiment, the system further optionally includes a portable, lockable battery charger 200, comprising a rechargeable battery 210, a housing 220, a first port 230 for allowing transfer of charge from AC-connectable device 100 to battery charger 200, and a second port 240 for allowing transfer of charge from battery charger 200 to a mobile device 300. Battery charger 200 may be charged by connection to AC-connectable device 100 through first port 230. During charging of battery charger 200, charge is transferred from power source 110 to rechargeable battery 210 through first port 230. Second port 230 may be a female USB port, a mini-USB port, a micro-USB port, an Apple Dock Connector, an Apple Thunderbolt™ port, or a proprietary port that allows for transfer of charge between two devices. The connection between the first port 230 and the power source 110 is typically a cable adapted to the particular port type. In example embodiments of the invention, first port 230 allows for bi-directional transfer of charge between AC-connectable device 100 and battery charger 200. In further example embodiments, first port 230 is a USB Type A female connection.

The battery charger 200 referenced herein is portable, and therefore, mobile device 300 may receive charge from battery charger 200 whether or not it is connected to AC-connectable device 100. A mobile device user may transport battery charger 200 from location to location and use it to charge or power mobile device 300 at any time. Battery charger 200 may also be used with a variety of different AC-connectable devices. For example, a mobile device user may attach battery charger 200 to a personal printer when at home, transport battery charger 200 while commuting to the office and use it to charge mobile device 300 during the commute, and then recharge battery charger 200 and mobile device 300 at the office by attaching it to a photocopy machine at the mobile device user's place of business.

An example battery charger 200 may be associated with and limited to use by a particular user, or may be generally usable by any mobile device user.

Figure 6:
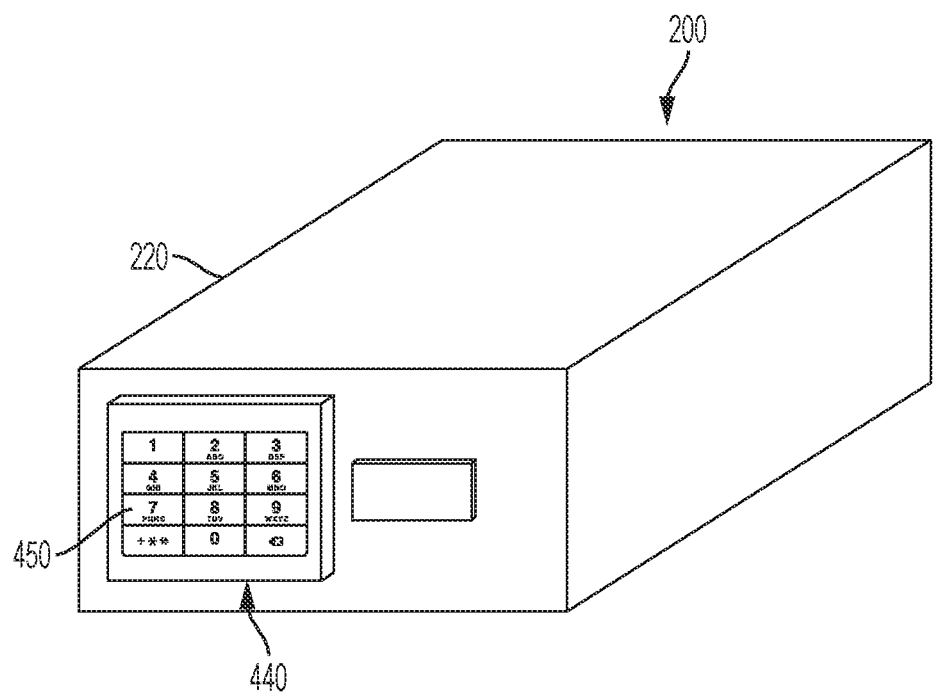
FIG. 6 is an example battery charger, showing a keypad on the battery charger for entering an authentication code to engage and disengage the locking mechanism.

FIG. 6 provides an example battery charger according to an embodiment of the invention where user interface 440 comprises a keypad 450 on the housing of battery charger 200. To engage or disengage lock 400, the user of battery charger 200 enters an appropriate authentication code using keypad 450. Activation of lock 400 occurs upon acceptance of the authentication code.

Alternatively, battery charger 200 may include an embedded identification code used for purposes of securing and releasing battery charger 200. In order to engage or disengage the lock, a user enters an authentication code associated with the charger's embedded identification code to identify herself as the owner of the battery charger. Examples of embedded identification codes include embedded RFID tags or codes programmed into the firmware of the battery charger.

Battery charger 200 may be used to power AC-connectable device 100 when it is not connected to an AC-power source. For example, battery charger 100 may be used as a standalone power source for a portable printer.

First port 230 may also allow for transfer of data between mobile device 300 and the controller 140 of AC-connectable device 100. The data connection allows for the mobile device 300 to use the features of AC-connectable device 100 directly. For example, when AC-connectable device 100 is an image forming apparatus, mobile device 300 may directly send printing commands to device 100 though first port 230.

Figure 7:
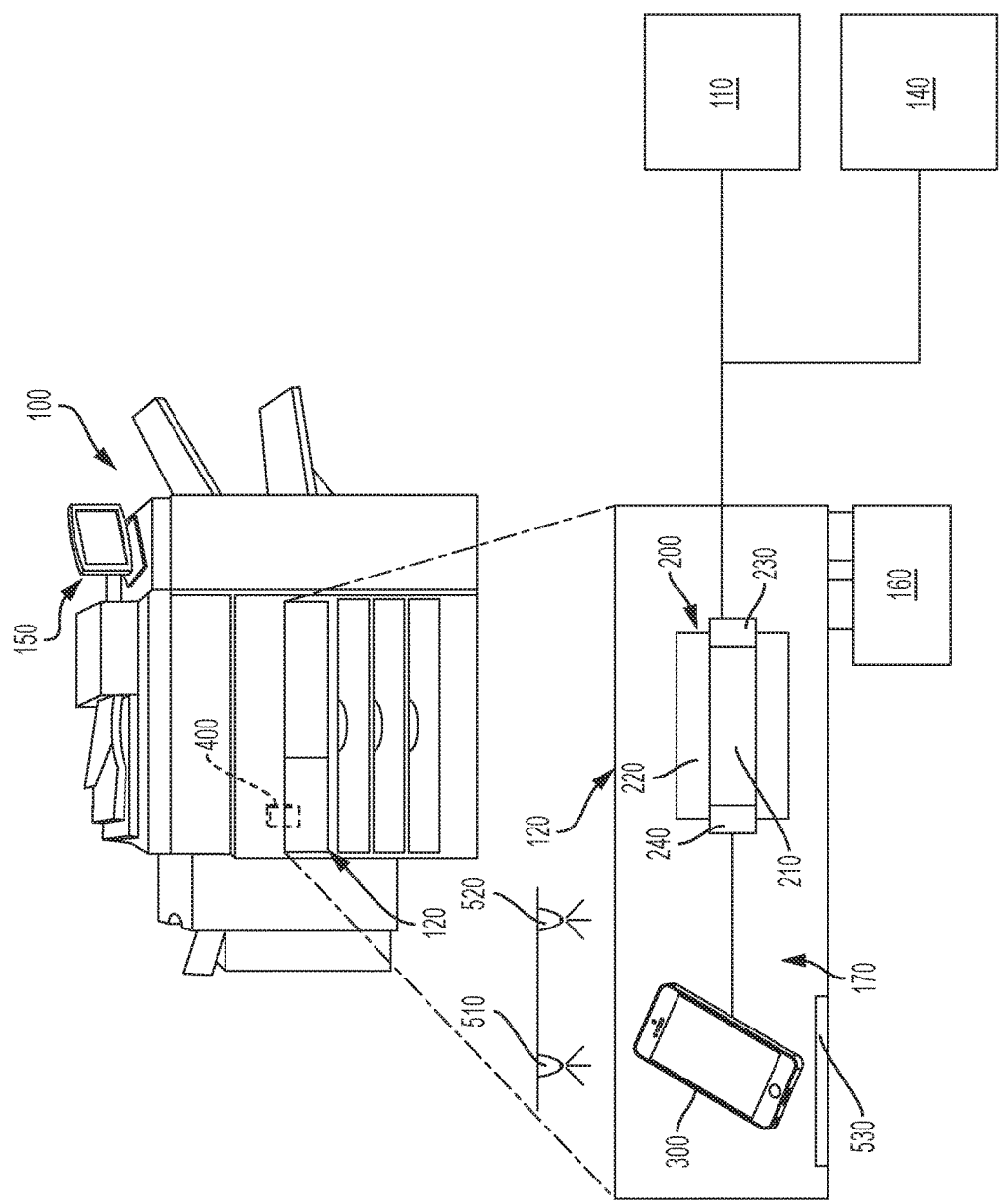
FIG. 7 is a cross-sectional of an example system, showing a mechanism for cleaning, sanitizing or drying a mobile device.
Figure 8:
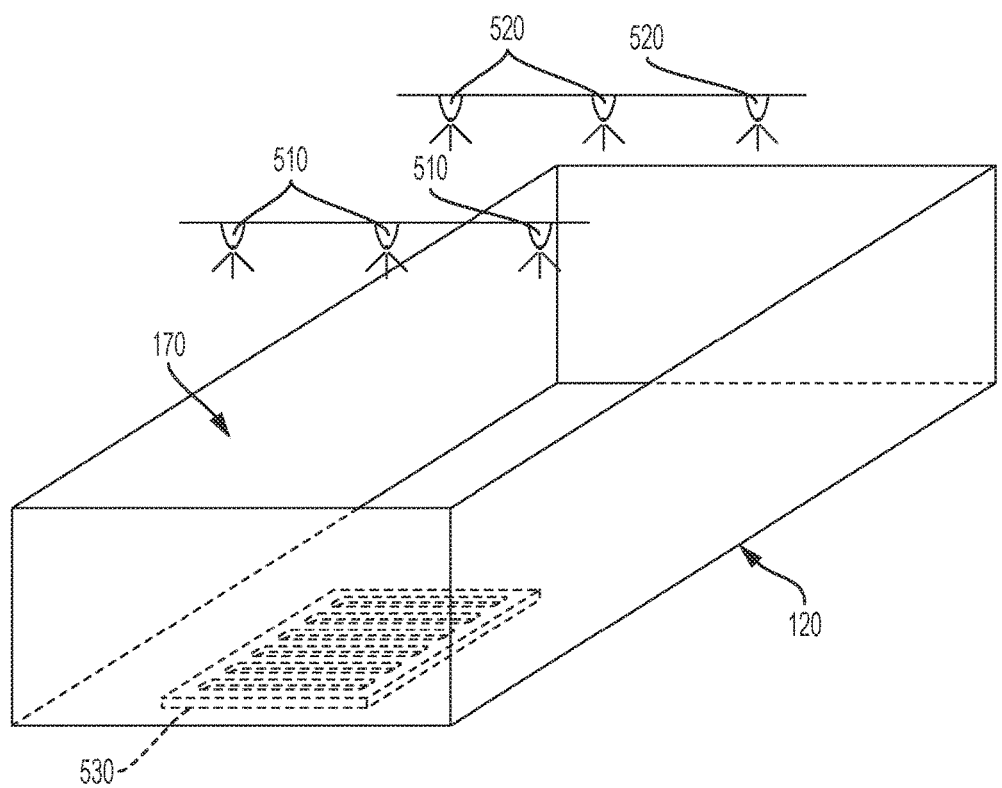
FIG. 8 is a perspective view an example system, showing a mechanism for cleaning, sanitizing or drying a mobile device.

Systems according to some embodiments of the invention may also optionally include a mechanism for cleaning, sanitizing and drying mobile device 300, as shown in FIGS. 7 and 8. To clean, sanitize and/or dry mobile device 300, the device is placed into charging area 120. Cleaning, sanitizing or drying of mobile device 300 is most easily effected when charging area 120 is a moveable compartment 170 or fixed compartment 180 in AC-connectable device 100. One or more streams of cleaning, sanitizing or drying fluid (e.g. a gas, such as pressurized air, for example) can be injected into the compartment, either simultaneously or at specified intervals. FIGS. 7 and 8 show a system with two sets of nozzles for injecting cleaning, sanitizing or drying fluids into a moveable compartment 170. First and second series of nozzles, 510 and 520 respectively, inject cleaning fluid, sanitizing fluid or drying fluid into compartment 170. Excess fluid is removed from compartment 170 through drain 530. Drain 530 may be positioned at any point in compartment 170 that does not interfere with either access to the first port 230 on battery charger 200, lock 400, or the mechanism for extending or retracting compartment 170.

Figure 9:
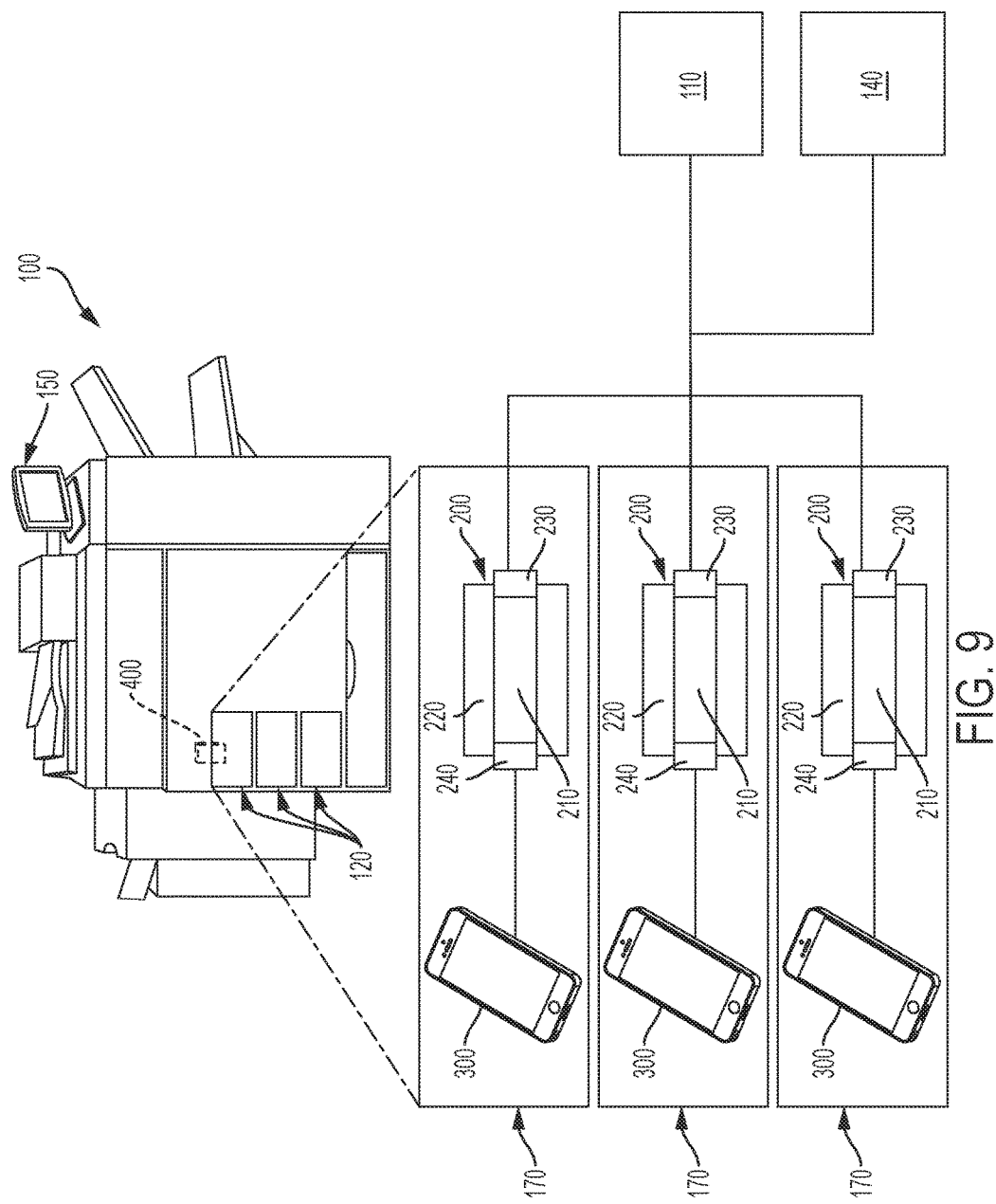
FIG. 9 is a front view of an example system, wherein the power source of the AC-connectable device is used to charge a plurality of battery chargers.

The system is not limited to a single charging area 120, but instead also allows for power source 210 to provide charge to a plurality of charging areas 120 and a plurality of associated battery chargers 200, as shown in FIG. 9.

Battery charger 200 may also be used to power AC-connectable device 100 when it is not connected to an AC power source. For example, if AC-connectable device 100 is a portable printer, there may be times when the mobile device user is transporting the printer and does not have ready access to an AC-power source. In these instances, the battery charger may be connected to the AC-connectable device 100 and used to provide power to the AC-connectable device.

While various aspects and example embodiments have been disclosed herein, other aspects and embodiments will be apparent to those skilled in the art. The various aspects and example embodiments disclosed herein are for purposes of illustration and are not intended to be limiting, with the true scope and spirit being indicated by the following claims.

Additionally, any enumeration of elements, blocks, or steps in this specification, the drawings or the claims is for purposes of clarity. Thus, such enumeration should not be interpreted to require or imply that these elements, blocks or steps adhere to a particular arrangement or are carried out in a particular order.

The invention claimed is:

1. A system for securely charging a mobile device, comprising an AC-connectable device having a power source and a secure charging compartment, wherein the secure charging compartment comprises a recess configured to accept a mobile device, a lock configured to secure the mobile device in the recess, and a charging port configured to reversibly transfer a charge from the mobile device to the power source.

2. The system of claim 1 wherein the secure charging compartment is reversibly slidable and the system further comprises a rail attached to the slidable secure charging and a motorized drive engaged with the rail configured to reversibly slide the compartment out of the AC-connectable device and allow placement of the mobile device in the compartment.

3. The system of claim 1 wherein the secure charging compartment is rotatable.

4. The system of claim 1 wherein the lock is actuated by a user-defined password.

5. The system of claim 4 wherein the user-defined password is transmitted wirelessly to the lock.

6. The system of claim 4 further comprising a user interface for inputting the user-defined password.

7. The system of claim 6 wherein the user interface is one of: a keypad, keyboard, touch-enabled display, pressure-sensitive display, RF magnetic card reader, RFID card reader, NFC chip reader, biometric sensor, retina scan sensor, voice recognition sensor, wi-fi receiver or Bluetooth receiver.

8. The system of claim 6 wherein the user interface is co-located with the AC-connectable device.

9. The system of claim 6 wherein the user interface is embedded in the secure charging compartment.

10. The system of claim 1 wherein the AC-connectable device is an image forming apparatus.

11. The system of claim 1 wherein the power source in the AC-connectable device is configured to provide charge to a plurality of mobile devices simultaneously.

12. The system of claim 1 wherein the AC-connectable device further receives printing commands from the mobile device through the charging port.

13. The system of claim 1 further comprising a cleaning mechanism configured to clean the mobile device deposited in the recess.

14. The system of claim 13 wherein the cleaning mechanism comprises a nozzle for injecting one of a cleaning fluid, a sanitizing fluid or a drying fluid into the secure charging compartment.

15. The system of claim 14 further comprising a second nozzle for injecting one of a cleaning fluid, a sanitizing fluid or a drying fluid into the secure charging compartment.

16. The system of claim 14 further comprising a drain in the secure charging compartment, wherein the drain is configured to remove the fluid injected into the secure charging compartment.

17. The system of claim 1 wherein the secure charging compartment is configured to inductively charge the mobile device.

* * * * *